United States Patent [19]

Nishioka

[11] Patent Number: 4,509,831
[45] Date of Patent: Apr. 9, 1985

[54] DIOPTER ADJUSTABLE EYEPIECE USED FOR VIEW-FINDERS OF SINGLE-LENS REFLEX CAMERAS OR THE LIKE

[75] Inventor: Kimihiko Nishioka, Hachiouji, Japan

[73] Assignee: Olympus Optical Co., Ltd., Tokyo, Japan

[21] Appl. No.: 355,143

[22] Filed: Mar. 5, 1982

[30] Foreign Application Priority Data

Mar. 13, 1981 [JP] Japan .................. 56-36143

[51] Int. Cl.³ .................. G02B 3/00; G02B 25/00
[52] U.S. Cl. .................................................. 350/410
[58] Field of Search ........................................ 350/410

[56] References Cited

U.S. PATENT DOCUMENTS 2,662,443  12/1953  Loeck .................. 350/423
4,217,048  8/1980  Egawa .................. 350/410

FOREIGN PATENT DOCUMENTS

1010226  11/1965  United Kingdom .

Primary Examiner—John K. Corbin
Assistant Examiner—Rebecca D. Gass
Attorney, Agent, or Firm—Cushman, Darby & Cushman

[57] ABSTRACT

An eyepiece used for view-finders of single-lens reflex cameras or the like comprising, as arranged in turn from the object side, a first lens component of a power negative as a whole and a second lens component of a power positive as a whole, either of the first lens component and second lens component being moved along the optical axis or both of them being moved along the optical axis in the respective directions reverse to each other in order that the movements of the lens components for adjusting the diopter may be small and the variations of various aberrations with the movements of the lens components may be small.

11 Claims, 12 Drawing Figures

DIOPTER ADJUSTABLE EYEPIECE USED FOR VIEW-FINDERS OF SINGLE-LENS REFLEX CAMERAS OR THE LIKE

BACKGROUND OF THE INVENTION (a) Field of the Invention

This invention relates to diopter adjustable eyepieces used for view-finders of single-lens reflex cameras or the like.

(b) Description of the Prior Art

Generally, in order to adjust the diopter of an eyepiece, the eyepiece may be moved forward and rearward with respect to the object. However, in case the diopter is to be adjusted by this system, the movement $\Delta$ per diopter of the eyepiece will become so large that, in case this system is incorporated in an optical instrument, the optical instrument will become so large as to be inconvenient. If $f_e$ is the focal length of the eyepiece, the movement $\Delta$ will be given by the following formula:

$$\Delta = (f_e^2 / 1000)$$

Figure 1:
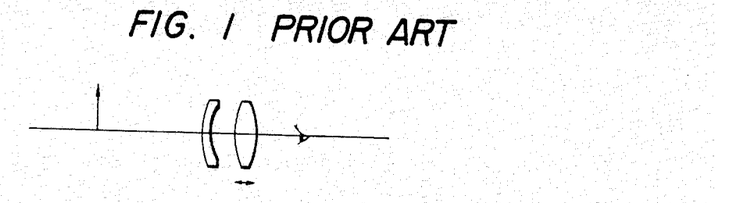
FIG. 1 is a view showing the formation of a conventional eyepiece.

Therefore, in order to make $\Delta$ small, as shown in FIG. 1, it will be considered to form the eyepiece of a concave lens and convex lens, to fix either one of the concave lens and convex lens and to make the other movable. For example, if the concave lens is fixed and the convex lens is made movable, if the focal length of the convex lens is $f_p$, the movement $\Delta_p$ of the convex lens will be given by the following formula:

$$\Delta_p = (f_p^2 / 1000)$$

If the composite focal length of an eyepiece consisting of a concave lens and convex lens as in this example is equal to the focal length $f_e$ of an eyepiece consisting of only a convex lens, as $f_p < f_e$, $\Delta_p < \Delta$ will be made. Therefore, the movement of the lens at the time of adjusting the diopter will be smaller in the case that the eyepiece is formed of two lenses than in the case that the eyepiece is formed of one lens.

However, this system shown in FIG. 1 of moving the convex lens in the eyepiece has such defect as in the following. If the focal length of the concave lens is $f_n$ and the distance between the concave lens and convex lens is d, in order that $f_e$ may be of a predetermined value, it will be necessary to determine $f_n$ by the following formula:

$$\frac{1}{f_n} = \frac{\frac{1}{f_e} - \frac{1}{f_p}}{1 - \frac{d}{f_p}} \quad (1)$$

If the distance from the object to the concave lens is S, in case the diopter of the eye is zero, that is, the virtual image formed by the eyepiece is infinitely far, in order to make $S < 0$, $d < f_p$ will have to be made. Further, according to the formula (1), if $f_p$ is made small, $|f_n|$ will be also become small. That is to say, if the power of the convex lens is made strong in order to make the movement $\Delta_p$ small, the power of the concave lens will have to be also made strong. In such case, even if the eyepiece is so designed that the aberrations will be canceled at a certain diopter, if the distance d is changed to adjust the diopter, the cancelation of the aberrations of the convex lens and the aberrations of the concave lens will be imperfect and aberrations will occur in the entire system. If the power of the convex lens is weakened in order to make the variations of the aberrations small, in the case of adjusting the diopter in a wide range, the movement of the convex lens will become large and the optical instrument will become so large in the total length as to be inconvenient to use.

SUMMARY OF THE INVENTION

In view of the above mentioned circumstances, a primary object of the present invention is to provide a diopter adjustable eyepiece for view-finders wherein the movement of the lens to adjust the diopter is small and the variation of aberrations when the lens is moved is small.

According to the present invention, this object is attained by a provision of a first lens component of a power negative as a whole and a second lens component of a power positive as a whole arranged on the side farther from the object than the first lens component, at least one of the first lens component and second lens component being able to be moved along the optical axis or the first lens component and second lens component being able to be moved in the respective directions reverse to each other.

According to a preferred formation of the present invention, the first lens component comprises a negative meniscus lens element or plano-concave lens element with the concave surface directed to the object side or a biconcave lens element and the second lens component comprises a meniscus convex lens element or plano-convex lens element with the concave surface directed to the object side, a biconvex lens element in which the radius of curvature of the surface on the object side is larger than the radius of curvature of the surface on the image side and a biconvex lens element.

Figure 2:
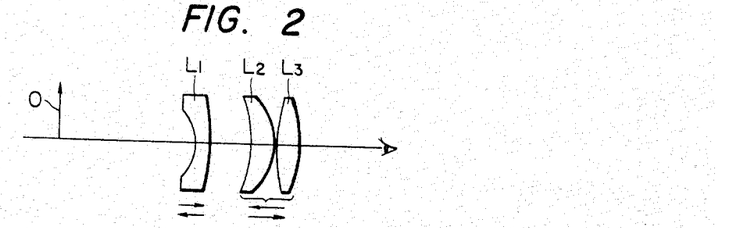
FIG. 2 is a view showing an example of the formation of an eyepiece of the present invention.

FIG. 2 shows an example of the formation of the eyepiece according to the present invention. As shown in this drawing, the eyepiece according to the present invention comprises a first lens component $L_1$ of a negative power which is a negative meniscus lens or plano-concave lens with the concave surface directed to the object side or a biconcave lens and a second lens component of a power positive as a whole consisting of a lens element $L_2$ which is a positive meniscus lens or plano-concave lens with the concave surface directed to the object side or a biconvex lens in which the radius of curvature of the surface on the object side is larger than the radius of curvature of the surface on the image side (the side on which the image of the eye is formed) and a lens element $L_3$ which is a biconvex lens. When the lens elements $L_2$ and $L_3$ of the second lens component moves integrally in the direction reverse to the first lens component $L_1$, the diopter will be adjusted. That is to say, in case the diopter displaces to be minus, the first lens component $L_1$ will move to the eye side and the lens elements $L_2$ and $L_3$ of the second lens group will integrally move to the object side and, in case the diopter displaces to be plus, the first lens component $L_1$ will move to the object side and the lens elements $L_2$ and $L_3$ of the second lens component will move to the eye side.

Why the variations of the aberrations will be small when the lens components are moved to adjust the diopter in case such lens formation as in the above is made shall be explained in the following.

In case the diopter is adjusted by moving the convex lens in the eyepiece shown in FIG. 1, the variations of the aberrations will be large because the negative aberrations of the convex lens of a strong power are corrected with the positive aberrations of the concave lens of a strong power. Therefore, in order to reduce the variations of the aberrations of the eyepiece, it is necessary to reduce the absolute values of the aberrations of the respective lens components forming the euepiece.

Figure 3:
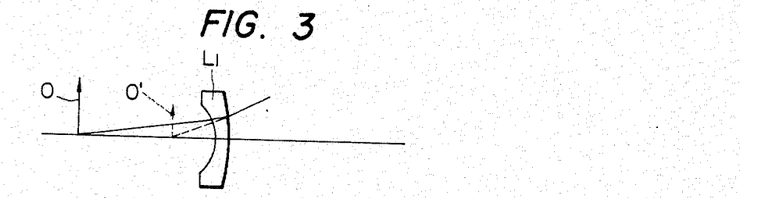
FIGS. 3 to 6 are views for explaining the feature of the eyepiece shown in FIG. 2.
Figure 4:
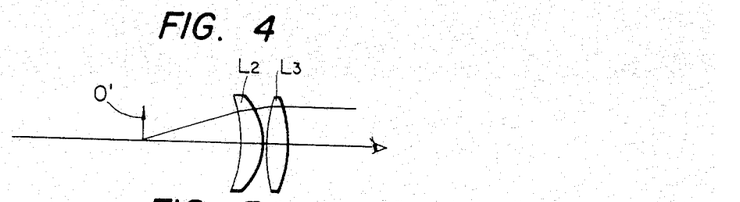

The first lens component $L_1$ and the lens elements $L_2$ and $L_3$ of the second lens component of the eyepiece shown in FIG. 2 shall be separately considered. FIG. 3 is a view showing the formation of a virtual image $O'$ of an object $O$ with the first lens component $L_1$. FIG. 4 is a view showing the formation of an image of a virtual object when the virtual image $O'$ shown in FIG. 3 is considered to be an object (which shall be called a virtual object).

In order that the variations of the aberrations may be small when the diopter is adjusted by changing the distance between the first lens component and second lens component, in both cases of forming the image shown in FIG. 3 and forming the image shown in FIG. 4, substantially no aberration may be made to occur.

It is preferable that, in the case of forming the image shown in FIG. 3, the first lens component $L_1$ will not generate a spherical aberration and coma for the object $O$. Therefore, an aplanatic or nearly aplanatic concave lens may be used for the first lens component $L_1$. Therefore, the contour of the first lens component $L_1$ may be of a meniscus lens or plano-concave lens with the concave surface directed to the object side or a biconcave lens.

Now, in the case of forming the image shown in FIG. 4, the lens elements $L_2$ and $L_3$ of the second lens component may be nearly aplanatic with respect to the formation of the virtual object $O'$. The formation of the image shown in FIG. 4 shall be considered as analyzed to the formation of the respective images by the respective lens components as shown in FIGS. 5 and 6.

Figure 5:
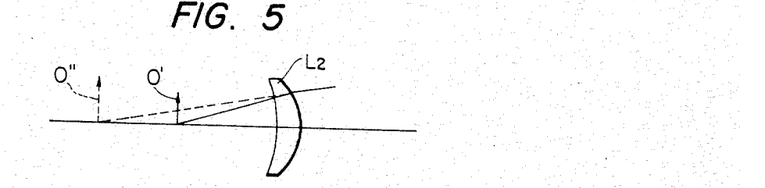
Figure 6:
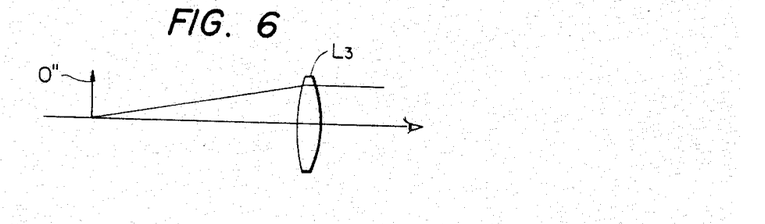

First of all, as shown in FIG. 5, the lens element $L_2$ is made close to an aplanatic contour. Therefore, the lens element $L_2$ may be a meniscus lens or plano-convex lens with concave surface directed to the object side or a biconvex lens in which the radius of curvature of the surface on the object side is larger than the radius of curvature of the surface on the image side. Further, as shown in FIG. 6, the lens element $L_3$ is made a biconvex lens in order to remove the spherical aberration in the case of forming the image of a second virtual object $O''$. In an eyepiece for view finders or the like, as the image is formed in the center of the field of view, it is important to remove the spherical aberration. In case the image height is smaller than the focal length as in a single reflex camera for endoscopes, the curvature of field will be so small that the spherical aberration may be removed. Further, even in a close-up high magnification view finder or the like, it is important to remove the spherical aberration.

If the lens elements $L_2$ and $L_3$ of the second lens component are formed as in the above, the aberrations of the entire second lens component will be able to be made small.

Further, in order that the aberration variations may be small at the time of adjusting the diopter, it is particularly effective that the composite focal length $f_2$ of the second lens component and the focal length $f_1$ of the first lens component will satisfy the following relations when the focal length of the entire eyepiece is $f_T$.

$$0.1f_T < f_2 < 0.65f_T$$

$$0.4f_T < |f_1| < 1.1f_T$$

When $|f_1|$ and $f_2$ become smaller than the above mentioned ranges, the aberrations will become worse and, when they become larger than the above mentioned ranges, the lens components will so remarkably increase in the movements so as to be unable to be incorporated in the camera.

It shall be explained in the following that, in case the above described eyepiece of the present invention is the same as the conventional one in the total length (the distance from the object to the rear end of the eyepiece), it will be possible to adjust the diopter in a wider range.

The case that the respective focal lengths of the concave lens and convex lens to form the conventional eyepiece shown in FIG. 1 are equal respectively to $f_1$ and $f_2$ in the eyepiece of the present invention shall be considered. In these eyepieces, the convex lens of the conventional one and the lens elements $L_2$ and $L_3$ of the present invention will move most to the eye side in case the diopter is brought to the plus side. At this time, if the convex lens shown in FIG. 1 and the lens component $L_1$ in the present invention are in the same position, if they are thought to be thin para-axial lens, the diopter will be the same. However, in the present invention, as the first lens component $L_1$ moves more to the object side than the concave lens of the conventional example, the diopter can be brought more to the plus side. Therefore, in case the total length of the eyepiece is the same, the diopter will be able to be brought more to the plus side in the eyepiece of the present invention than in the conventional example. The feature of the present invention that the diopter adjustment is possible over this wide diopter range can be obtained not only in the lens system of such formation as is shown in FIG. 2 but also in the case that the lens component (the second lens component) of a positive power is one convex lens.

Further, in the eyepiece of the present invention, when the first lens group and second lens group are moved in the respective directions reverse to each other, in case the same diopter range is adjusted, the movement of the convex lens component will become smaller and will be more advantageous to the mechanical design than in the case that only the convex lens is moved as in the conventional example.

By the way, even if only one lens component is moved in one diopter range and the first lens component and second lens component are moved in the reverse directions in the other diopter range, the adjustment will be able to be made over a wide diopter range with small movements.

DESCRIPTION OF PREFERRED EMBODIMENTS

Now, numerical data will be described below as preferred embodiments of the eyepiece according to the present invention:

| Embodiment 1: | | |
|---|---|---|
| $r_1 = \infty$ | | |
| | $d_1 = 24.297$ | |
| $r_2 = 143.1785$ | | |
| | $d_2 = 7.476$ | $n_1 = 1.6968$ |
| $r_3 = -143.1785$ | | |
| | $d_3 = 0.3738$ | |
| $r_4 = 71.1005$ | | |
| | $d_4 = 4.6725$ | $n_2 = 1.6968$ |
| $r_5 = 985.6041$ | | |
| | $d_5 = $ (variable) | |
| $r_6 = \infty$ | | |
| | $d_6 = 3.738$ | $n_3 = 1.78472$ |
| $r_7 = 62.7479$ | | |
| | $d_7 = $ (variable) | |
| $r_8 = \infty$ | | |
| | $d_8 = 104.664$ | $n_4 = 1.79952$ |
| $r_9 = \infty$ | | |
| | $d_9 = 0.0561$ | |
| $r_{10} = \infty$ | | |
| | $d_{10} = 5.981$ | $n_5 = 1.8061$ |
| $r_{11} = -48.9865$ | | |
| $f_T = 100.026$ mm | $f_1 = -79.96$ mm | |
| $f_2 = 53.96$ mm | | |
| Maximum Image Height = 13.08 mm | Diameter of exit pupil = 15.2 mm | |

| Embodiment 2: | | |
|---|---|---|
| $r_1 = \infty$ | | |
| | $d_1 = 24.3$ | |
| $r_2 = 61.238$ | | |
| | $d_2 = 6.667$ | $n_1 = 1.5891$ |
| $r_3 = 66.516$ | | |
| | $d_3 = $ (variable) | |
| $r_4 = -40.9661$ | | |
| | $d_4 = 3.333$ | $n_2 = 1.78472$ |
| $r_5 = -104.693$ | | |
| | $d_5 = $ (variable) | |
| $r_6 = \infty$ | | |
| | $d_6 = 104.664$ | $n_3 = 1.7995$ |
| $r_7 = \infty$ | | |
| | $d_7 = 0.18$ | |
| $f_T = 100.02$ mm | $f_1 = -87.78$ mm | |
| $f_2 = 55.19$ mm | | |
| Maximum Image Height = 15.8 mm | Diameter of Exit Pupil = 7 mm | |

| Embodiment 3: | | |
|---|---|---|
| $r_1 = \infty$ (Entrance Pupil) | | |
| | $d_1 = 25.0739$ | |
| $r_2 = \infty$ | | |
| | $d_2 = 2.8068$ | $n_1 = 1.51633$ |
| $r_3 = \infty$ | | |
| | $d_3 = $ (variable) | |
| $r_4 = 89.8226$ | | |
| | $d_4 = 15.3437$ | $n_2 = 1.63854$ |
| $r_5 = -89.8226$ | | |
| | $d_5 = 0.3742$ | |
| $r_6 = 93.7708$ | | |
| | $d_6 = 3.5553$ | $n_3 = 1.717$ |
| $r_7 = \infty$ | | |
| | $d_7 = $ (variable) | |
| $r_8 = -99.0457$ | | |
| | $d_8 = 2.8068$ | $n_4 = 1.78472$ |
| $r_9 = 99.0457$ | | |
| | $d_9 = $ (variable) | |
| $r_{10} = \infty$ | | |
| | $d_{10} = 104.7865$ | $n_5 = 1.79952$ |
| $r_{11} = \infty$ | | |
| | $d_{11} = 0.05$ | |
| $f_T = 100.00$ mm | $f_1 = -62.718$ mm | |
| $f_2 = 47.979$ mm | | |
| Maximum Image Height = 12.7 mm | Diameter of Exit Pupil = 12.7 mm | | where $r_1$ through $r_{11}$ denote radii of curvature of the respective surfaces of the lenses, $d_1$ through $d_{11}$ denote thicknesses of the respective lenses and $n_1$ through $n_5$ denote refractive indices of the respective lenses.

Figure 7:
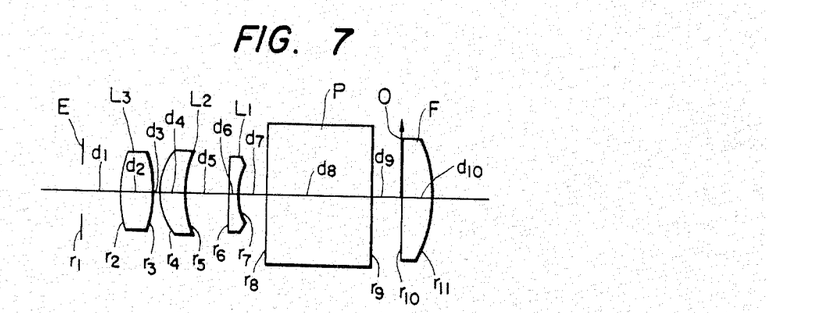
FIG. 7 is a view showing a lens formation of Embodiment 1 of the present invention.
Figure 8:
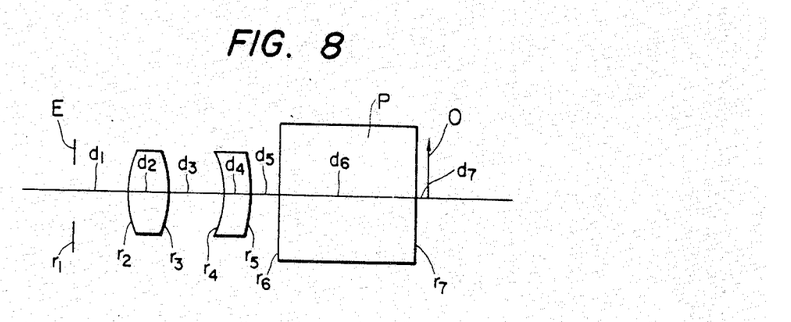
FIG. 8 is a view showing a lens formation of Embodiment 2 of the present invention.
Figure 9:
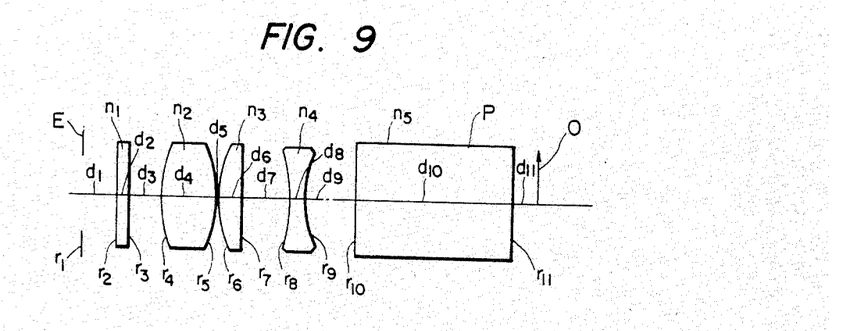
FIG. 9 is a view showing a lens formation of Embodiment 3 of the present invention.

Among the above embodiments, Embodiment 1 is of the eyepiece shown in FIG. 7, Embodiment 2 is of the eyepiece shown in FIG. 8 and Embodiment 3 is of the eyepiece shown in FIG. 9. In these drawings, the left side is shown as the eye side, the right side is shown as the object side, the symbol E denotes an exit pupil, P denotes a prism, F denotes a field lens and O denotes an object surface. As the plane side of the field lens is an image forming surface, an image forming reticle may be provided on this surface by such method as photoetching.

Further, to adjust the diopter, $d_5$ and $d_7$ are varied in Embodiment 1, $d_3$ and $d_5$ are varied in Embodiment 2 and $d_3$, $d_7$ and $d_9$ are varied in Embodiment 3. The values for the respective diopters of these $d_5$, $d_7$; $d_3$, $d_5$ or $d_3$, $d_7$, $d_9$ are as follows:

| Embodiment 1: | | |
|---|---|---|
| Diopter | $d_5$ | $d_7$ |
| 2.23 | 19.4974 | 3.738 |
| −0.54 | 10.8402 | 4.6725 |
| −3.74 | 2.1815 | 5.607 |

| Embodiment 2: | | |
|---|---|---|
| Diopter | $d_3$ | $d_5$ |
| 2.5 | 25.356 | 2.673 |
| −0.54 | 14.843 | 4.673 |
| −2.5 | 8.960 | 6.000 |

| Embodiment 3: | | | |
|---|---|---|---|
| Diopter | $d_3$ | $d_7$ | $d_9$ |
| 2.14 | 1.3865 | 15.4598 | 2.8068 |
| −0.54 | 6.7681 | 9.0592 | 3.7424 |
| −3.2 | 12.1515 | 2.8236 | 4.678 |

In Embodiment 2 among the above embodiments, the second lens component is formed of one convex lens. In this embodiment, in order to correct the coma and spherical aberrations, the focal length $f_2$ of the second lens component (convex lens) is made to satisfy the following condition:

$$0.8f_T > f_2 > 0.4f_T$$

For the same reason, the first lens component is made a meniscus concave lens with the convex surface directed to the object side and its focal length $f_1$ is made to satisfy the following condition:

$$1.1f_T > f_1 > 0.6f_T$$

In either of the above mentioned conditions, when the upper limit is exceeded, the movement of the lens for the adjustment of the diopter will become large and, when the lower limit is exceeded, the aberration will deteriorate. It is not desirable.

Figure 10:
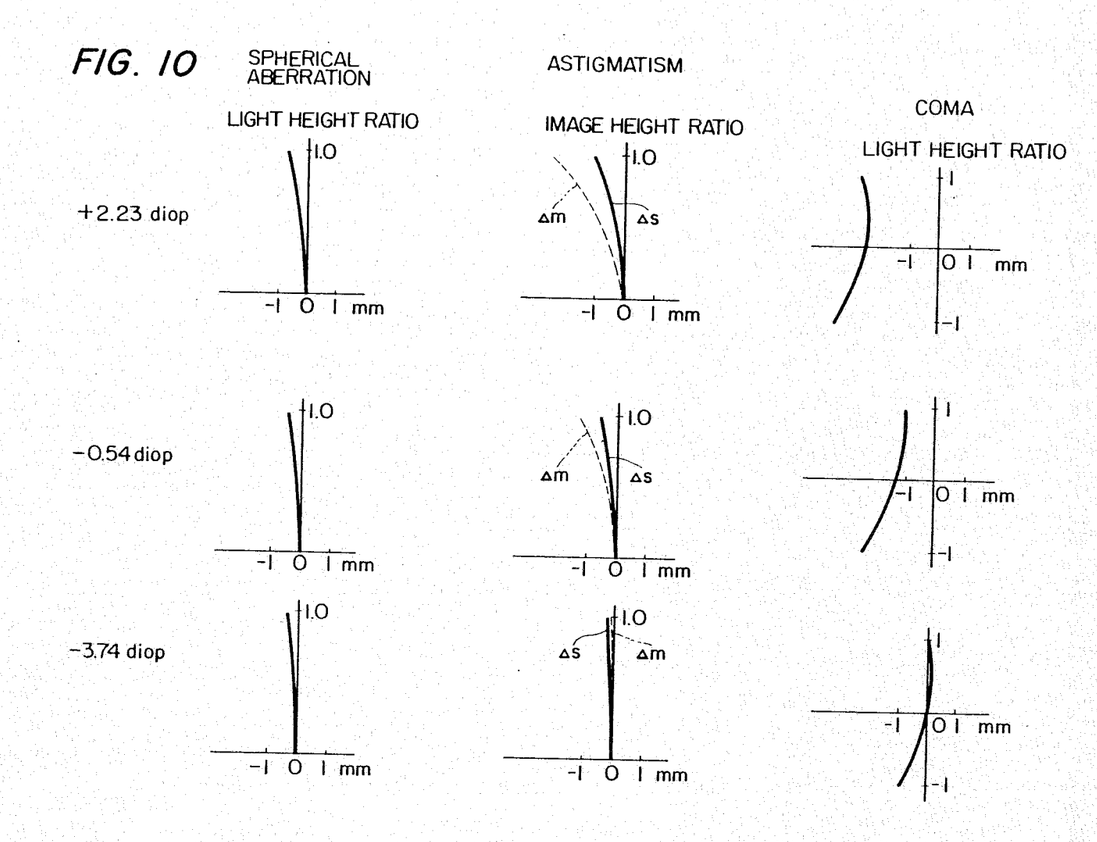
FIG. 10 is of aberration curve diagrams of Embodiment 1.
Figure 11:
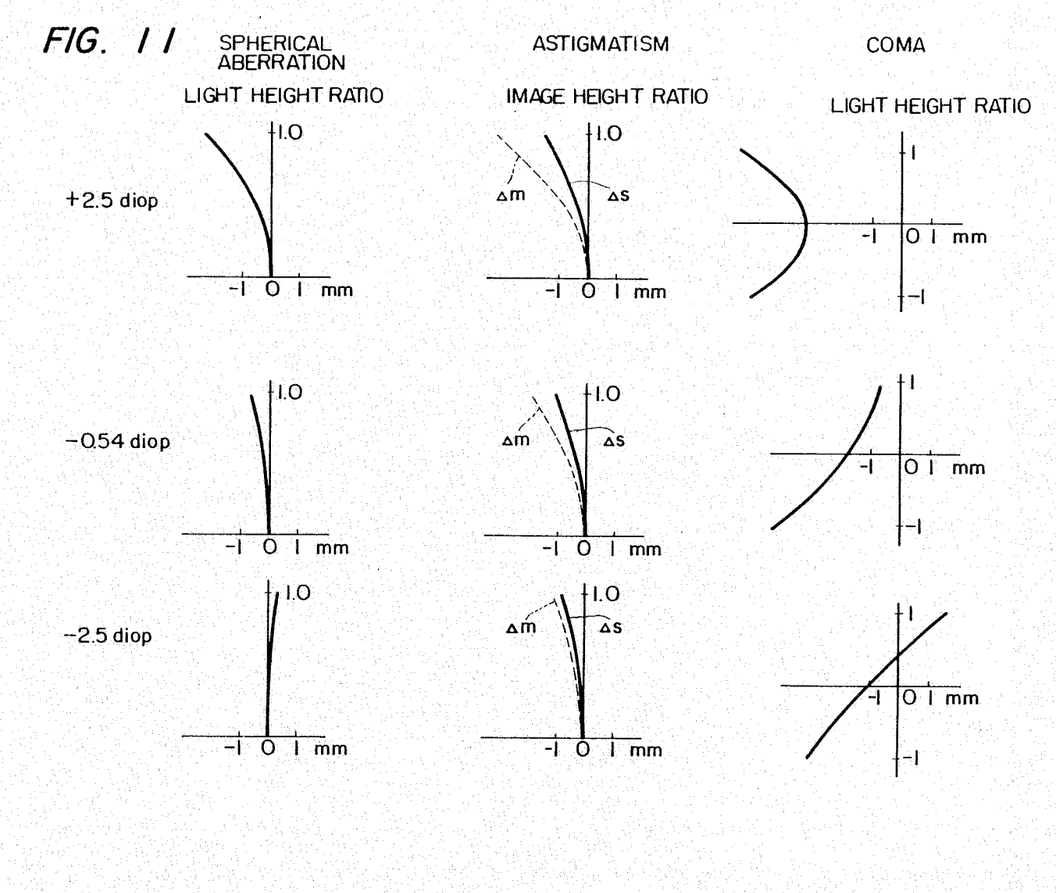
FIG. 11 is of aberration curve diagrams of Embodiment 2.
Figure 12:
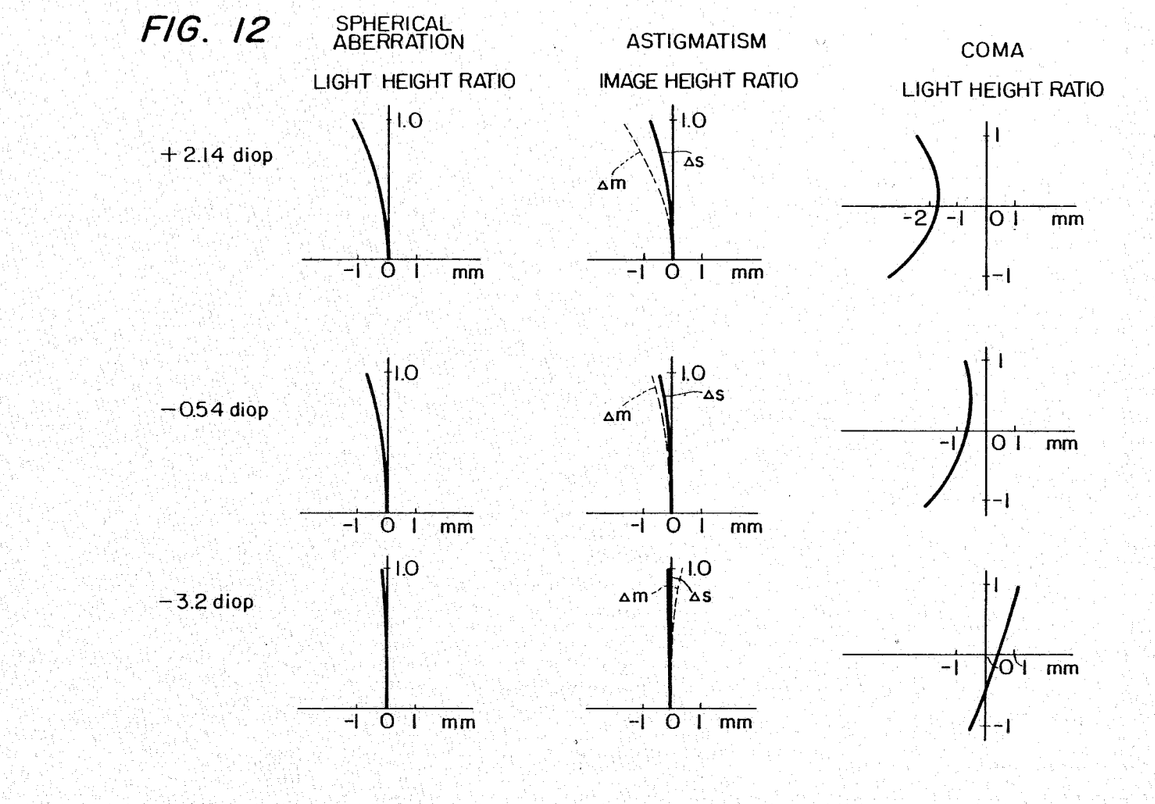
FIG. 12 is of aberration curve diagrams of Embodiment 3.

By the way, FIG. 10 shows respective aberration curve diagrams of Embodiment 1 of the case that the diopter is 2.23, −0.54 and −3.4(diopters). FIG. 11 shows respective aberration curve diagrams of Embodiment 2 of the case that the diopter is 2.5, −0.54 and −2.5. Further, FIG. 12 shows respective aberration curve diagrams of Embodiment 3 showing the case that the diopter is 2.14, −0.54 and −3.2. In each of these aberration curves, the light is incident from the exit pupil side and is reversely traced.

I claim:

1. An eyepiece used for view finders of single-lens reflex cameras or the like comprising a first lens component of a power negative as a whole having a substantially aplanatic contour, and a second lens component of a power positive as a whole arranged on the side farther from an object than said first lens component and consisting of two lens elements each having a substantially aplanatic contour, at least one of said first lens component and second lens component being able to be moved along the optical axis to adjust the diopter.

2. An eyepiece according to claim 1 wherein said first lens component and second lens component are moved in respective directions reverse to each other.

3. An eyepiece according to claim 1 or 2 wherein said first lens component comprises a negative meniscus lens element with the concave surface directed to the object side, said second lens component comprises a positive meniscus lens element with the concave surface directed to the object side and a biconvex lens element and said eyepiece satisfies the following conditions:

$0.4f_T < |f_1| < 1.1f_T$ $0.1f_T < f_2 < 0.65f_T$ wherein the reference symbol $f_T$ represents a focal length of the entire eyepiece, the reference symbol $f_1$ represents a focal length of the first lens component, and the reference symbol $f_2$ represents a focal length of the second lens component.

4. An eyepiece according to claim 1 or 2 wherein said first lens component comprises a plano-concave lens element with the concave surface directed to the object side, said second lens component comprises a positive meniscus lens element with the concave surface directed to the objective side and a biconvex lens element and said eyepiece satisfies the following conditions:

$0.4f_T < |f_1| < 1.1f_T$ $0.1f_T < f_2 < 0.65f_T$ wherein the reference symbol $f_T$ represents a focal length of the entire eyepiece, the reference symbol $f_1$ represents a focal length of the first lens component, and the reference symbol $f_2$ represents a focal length of the second lens component.

5. An eyepiece according to claim 4 having the following numerical data:

| | | |
|---|---|---|
| $r_1 = \infty$ | | |
| | $d_1 = 24.297$ | |
| $r_2 = 143.1785$ | | |
| | $d_2 = 7.476$ | $n_1 = 1.6968$ |
| $r_3 = -143.1785$ | | |
| | $d_3 = 0.3738$ | |
| $r_4 = 71.1005$ | | |
| | $d_4 = 4.6725$ | $n_2 = 1.6968$ |
| $r_5 = 985.6041$ | | |
| | $d_5 = $ (variable) | |
| $r_6 = \infty$ | | |
| | $d_6 = 3.738$ | $n_3 = 1.78472$ |
| $r_7 = 62.7479$ | | |
| | $d_7 = $ (variable) | |
| $r_8 = \infty$ | | |
| | $d_8 = 104.664$ | $n_4 = 1.79952$ |
| $r_9 = \infty$ | | |
| | $d_9 = 0.0561$ | |
| $r_{10} = \infty$ | | |
| | $d_{10} = 5.981$ | $n_5 = 1.8061$ |
| $r_{11} = -48.9865$ | | |
| $f_T = 100.026$ mm | | $f_1 = -79.96$ mm |
| $f_2 = 53.96$ mm | | |

Maximum Image Height = 13.08 mm Diameter of Exit Pupil = 15.2 mm wherein the reference symbols $r_1$ through $r_{11}$ represent radii of curvature on the surfaces of the respective lens elements, the reference symbols $d_1$ through $d_{10}$ represent thicknesses of the respective lens elements and airspaces therebetween, and the reference symbols $n_1$ through $n_5$ represent refractive indices of the respective lens elements.

6. An eyepiece according to claim 1 or 2 wherein said first lens component comprises a biconcave lens element, said second lens component comprises a plano-convex lens element and a biconvex lens element and said eyepiece satisfies the following conditions:

$0.4f_T < |f_1| < 1.1f_T$ $0.1f_T < f_2 < 0.65f_T$ wherein the reference symbol $f_T$ represents a focal length of the entire eyepiece, the reference symbol $f_1$ represents a focal length of the first lens component, and the reference symbol $f_2$ represents a focal length of the second lens component.

7. An eyepiece according to claim 6 having the following numerical data:

| | | |
|---|---|---|
| $r_1 = \infty$ | | |
| | $d_1 = 25.0739$ | |
| $r_2 = \infty$ | | |
| | $d_2 = 2.8068$ | $n_1 = 1.51633$ |
| $r_3 = \infty$ | $d_3 = $ (variable) | |
| $r_4 = -89.8226$ | | |
| | $d_4 = 15.3437$ | $n_2 = 1.63854$ |
| $r_5 = -89.8226$ | | |
| | $d_5 = 0.3742$ | |
| $r_6 = 93.7708$ | | |
| $r_7 = \infty$ | $d_6 = 3.5553$ | $n_3 = 1.717$ |
| $r_8 = -99.0457$ | $d_7 = $ (variable) | $n_4 = 1.78472$ |
| $r_9 = 99.0457$ | $d_8 = 2.8068$ | |
| $r_{10} = \infty$ | $d_9 = $ (variable) | $n_5 = 1.79952$ |
| $r_{11} = \infty$ | $d_{10} = 104.7865$ | |
| | $d_{11} = 0.05$ | |
| $f_T = 100.00$ mm | | |
| | $f_1 = -62.718$ mm | |
| $f_2 = 47.979$ mm | | |

Maximum Image Height = 12.7 mm Diameter of Exit Pupil = 12.7 mm wherein the reference symbols $r_1$ through $r_{11}$ represent radii of curvature on the surfaces of the respective lens components, the reference symbols $d_1$ through $d_{11}$ represent thicknesses of the respective lens components and airspaces therebetween, and the reference symbols $n_1$ through $n_5$ represent refractive indices of the respective lens components.

8. An eyepiece according to claim 1 or 2 wherein said first lens component comprises a biconcave lens element, said second lens component comprises a biconvex lens element in which the radius of curvature on the surface directed to the object side is larger than that on the surface directed to the image side and a biconvex lens element and said eyepiece satisfies the following conditions:

$$0.4f_T < |f_1| < 1.1f_T$$

$$0.1f_T < f_2 < 0.65f_T$$

wherein the reference symbol $f_T$ represents a focal length of the entire eyepiece, the reference symbol $f_1$ represents a focal length of the first lens component, and the reference symbol $f_2$ represents a focal length of the second lens component.

9. An eyepiece used for view finders of single-lens reflex cameras or the like comprising a first lens component of a power negative as a whole having a substantially aplanatic contour, and a second lens component of a power positive as a whole arranged on the side farther from an object than said first lens component and consisting of one convex lens element having a substantially aplanatic contour, at least one of said first lens component and second lens component being able to be moved along the optical axis to adjust the diopter.

10. An eyepiece according to claim 9 wherein:
said first lens component comprises a negative meniscus lens component with the convex surface thereof directed toward the object;
said second lens component comprises a biconvex lens component and said eyepiece satisfies the following conditions:

$$1.1f_T > f_1 > 0.6f_T$$

$$0.8f_T > f_2 > 0.4f_T$$

wherein the reference symbol $f_T$ represents a focal length of the entire eyepiece, the reference symbol $f_1$ represents a focal length of the first lens group, and the reference symbol $f_2$ represents a focal length of the second lens group.

11. An eyepiece according to claim 9 having the following numerical data:

| | | |
|---|---|---|
| $r_1 = \infty$ (Entrance Pupil) | | |
| | $d_1 = 24.3$ | |
| $r_2 = 61.238$ | | |
| | $d_2 = 6.667$ | $n_1 = 1.5891$ |
| $r_3 = -66.516$ | | |
| | $d_3 =$ (variable) | |
| $r_4 = -40.9661$ | | |
| | $d_4 = 3.333$ | $n_2 = 1.78472$ |
| $r_5 = -104.693$ | | |
| | $d_5 =$ (variable) | |
| $r_6 = \infty$ | | |
| | $d_6 = 104.664$ | $n_3 = 1.7995$ |
| $r_7 = \infty$ | | |
| | $d_7 = 0.184$ | |
| $f_T = 100.02$ mm | | $f_1 = -87.78$ mm |
| $f_2 = 55.19$ mm | | |

Maximum Image Height = 15.8 Diameter of Exit Pupil = 7 mm wherein the reference symbols $r_1$ through $r_7$ represent radii of curvature on the surfaces of the respective lens components, the reference symbols $d_1$ through $d_7$ represent thicknesses of the respective lens components and airspaces therebetween, and the reference symbols $n_1$ through $n_3$ represent refractive indices of the respective lens components.

* * * * *

UNITED STATES PATENT AND TRADEMARK OFFICE
CERTIFICATE OF CORRECTION

PATENT NO. : 4,509,831
DATED : April 9, 1985
INVENTOR(S) : K. Nishioka

It is certified that error appears in the above—identified patent and that said Letters Patent is hereby corrected as shown below:

Column 8, line 48, change "$r_4 = -89.8226$" to read --$r_4 = 89.8226$--

Signed and Sealed this

Seventeenth Day of September 1985

[SEAL]

Attest:

*Attesting Officer*

DONALD J. QUIGG

*Commissioner of Patents and Trademarks—Designate*